United States Patent [19]

McKenna

[11] Patent Number: 4,722,712
[45] Date of Patent: Feb. 2, 1988

[54] GEOMETRIC TOY

[76] Inventor: Katharine L. McKenna, 100 Hudson St., Apt. 5C, New York, N.Y. 10013

[21] Appl. No.: 754,149

[22] Filed: Jul. 12, 1985

[51] Int. Cl.⁴ ............................................ A63H 33/04
[52] U.S. Cl. ........................................ 446/92; 446/99; 446/487
[58] Field of Search ................ 446/100, 99, 102, 104, 446/487, 101, 92, 97, 85; 273/157 R

[56] References Cited

U.S. PATENT DOCUMENTS

| | | |
|---|---|---|
| 1,269,233 | 6/1918 | Warga . |
| 1,430,557 | 10/1922 | Jervis . |
| 2,751,634 | 6/1956 | Washington ........................ 446/487 |
| 2,886,324 | 5/1959 | Cowan . |
| 2,901,256 | 8/1959 | Way . |
| 3,407,530 | 10/1968 | Grant et al. . |
| 3,518,786 | 7/1970 | Holtvoigt ............................. 446/85 |
| 3,561,757 | 2/1971 | Schilling ........................ 446/104 X |
| 4,208,832 | 6/1980 | Corriveau .......................... 446/100 |
| 4,323,245 | 4/1982 | Beaman . |

OTHER PUBLICATIONS

Steinhaus, Mathematical Snapshots, pp. 3-5, 297, (1983), Oxford University Press.

Primary Examiner—Mickey Yu

[57] ABSTRACT

An educational toy including four geometric members arrangeable to form a plurality of stylized representations of animals. In one embodiment, the four geometric members are blocks sequentially rotatably connected, the members being arrangeable to form a square and to form an equilateral triangle, the stylized representations of animals being formed in positions intermediate the square and equilateral triangle configurations. In another embodiment the geometric members are made of cloth and filled with a stuffing material. Elements may be provided for detachable attachment to the geometric members, to further characterize the representations. A method for forming the stylized represention of animals is also disclosed.

13 Claims, 19 Drawing Figures

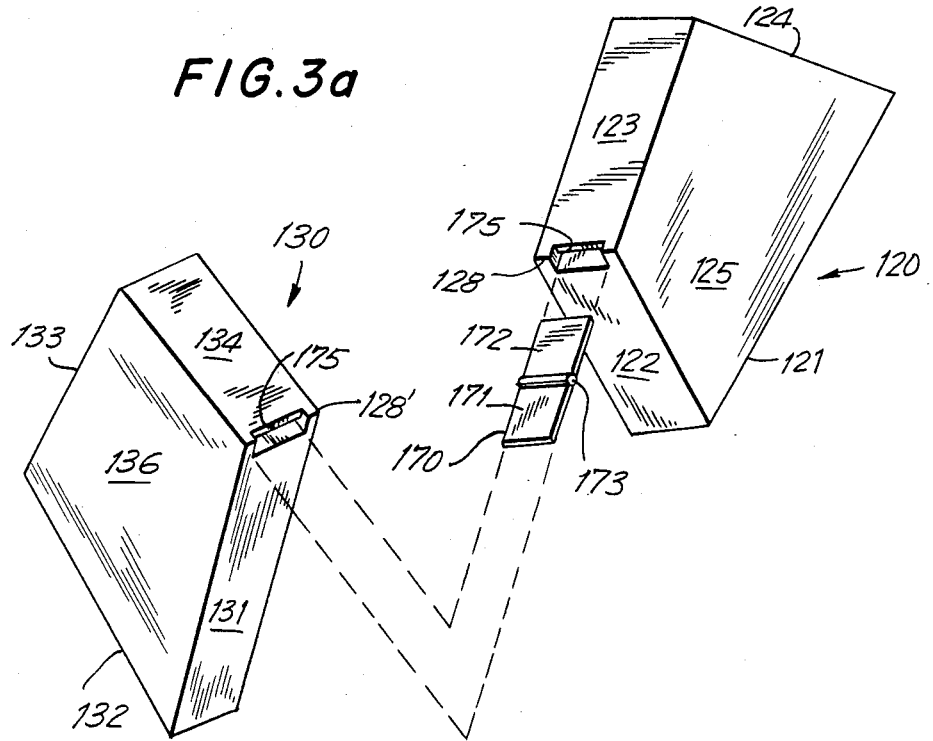
FIG. 3a
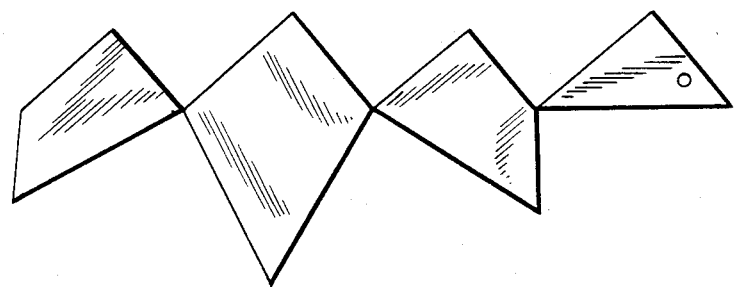
FIG. 15
FIG. 16

GEOMETRIC TOY

FIELD OF INVENTION

The present invention relates to an educational toy for young children. More specifically, the present invention relates to an educational toy comprising a plurality of geometrically shaped elements that may be positioned in such manner as to obtain a plurality of stylized representations of especially animal figures. Most specifically, the present invention concerns a toy comprising four sequentially connected geometric members rotatably positionable to provide a multiplicity of stylized representations of animals.

BACKGROUND OF INVENTION

A number of games or puzzles based on juxtaposing a plurality of geometric shapes are known. Perhaps the earliest is the Chinese tangram puzzle as described in R. C. Read, Tangrams, Dover Inc. (1965), which comprises seven geometric pieces positionable to form a square. The pieces can be rearranged to form many arbitrary configurations.

In U.S. Pat. No. 1,430,557 to Jervis, a set of blocks of particular shapes and proportions are disclosed, which blocks may be rearranged to obtain representations of, for example, a lighthouse, a horse, an airplane, a ship, and the like. The blocks of the Jarvis set are not connected, and the child is free to arrange them in any particular manner. In U.S. Pat. No. 1,269,233 to Warga, a puzzle is disclosed, the puzzle comprising a plurality of geometrically shaped pieces, that may be arranged to provide animal representations. U.S. Pat. No. 3,407,530 to Grant et al discloses a sectionally formed toy with identifying indicia, the component parts being unconnected, but being assembled by providing, for example, magnet means on or within each of the parts.

Another puzzle having geometrically shaped pieces is disclosed in U.S. Pat. No. 2,886,324 to Cowan. In the Cowan invention, the pieces may be assembled to form, for example, a seal, a cat, and the like. In U.S. Pat. No. 4,323,245 to Beaman, a three dimensional device having differently shaped interfitting modular units is disclosed, while in U.S. Pat. No. 2,901,256 to Way, a pentagonal block puzzle is illustrated.

H. Steinhaus, *Mathematical Snapshots*, Oxford University Press, Reprint ed. (1983), illustrates a geometric oddity wherein an equilateral triangle can be divided into four geometric members that can be rearranged to form a square of the same area.

SUMMARY OF THE INVENTION

It is an object of the present invention to provide a toy for the amusement of children.

It is also an object of the present invention to provide a toy that will promote and enhance a child's perception of forms and images.

It is a primary object of the present invention to provide a toy requiring manual positioning and repositioning of the component members of the toy to obtain stylized forms and images, for example, of identifiable representations of animals.

These and other benefits and advantages of the invention will be best understood by reading, with reference to the drawings, the detailed description of the invention, a summary of which now follows:

The educational toy of the present invention comprises four geometric members with side walls of predetermined thickness, said members being arrangeable to form a square and being also arrangeable to form an equilateral triangle, said geometric members being a first member that is a right triangle having a hypotenuse as one side wall and a leg as another side wall; a second member that is a quadrilateral; a third member that is a quadrilateral and a fourth member that is a quadrilateral one side wall of which is equal in length to said leg and another side wall of which is adjacent to said one side wall of said fourth member, said leg abutting said one side wall and said hypotenuse being collinear with said another side wall, in the equilateral triangle configuration; and means to at least detachably sequentially connect said first member to said second member, said second member to said third member, and said third member to said fourth member, to provide rotatability of said members from and to the square and equilateral triangle configurations, whereby, by rotational positioning of the four geometric members to positions intermediate to said square and said equilateral triangle, the stylized representations of animal figures are obtained.

Another aspect of the present invention concerns a method for forming from four geometrically shaped elements provided, for example, in kit form, said elements being adapted to interfit as to form a square and an equilateral triangle of equal area, a plurality of stylized animal representations, the method comprising the step of arranging said geometrically shaped elements to predetermined positions, whereby the stylized representations of animals are obtained.

DESCRIPTION OF THE DRAWINGS

FIG. 3a is a partial, exploded view of the toy shown in FIG. 3, illustrating alternate means for connecting the geometric members.

FIGS. 4 to 16 are stylized representations of animals obtained in accordance with the practice of the present invention.

DETAILED DESCRIPTION OF THE INVENTION

Figure 1:
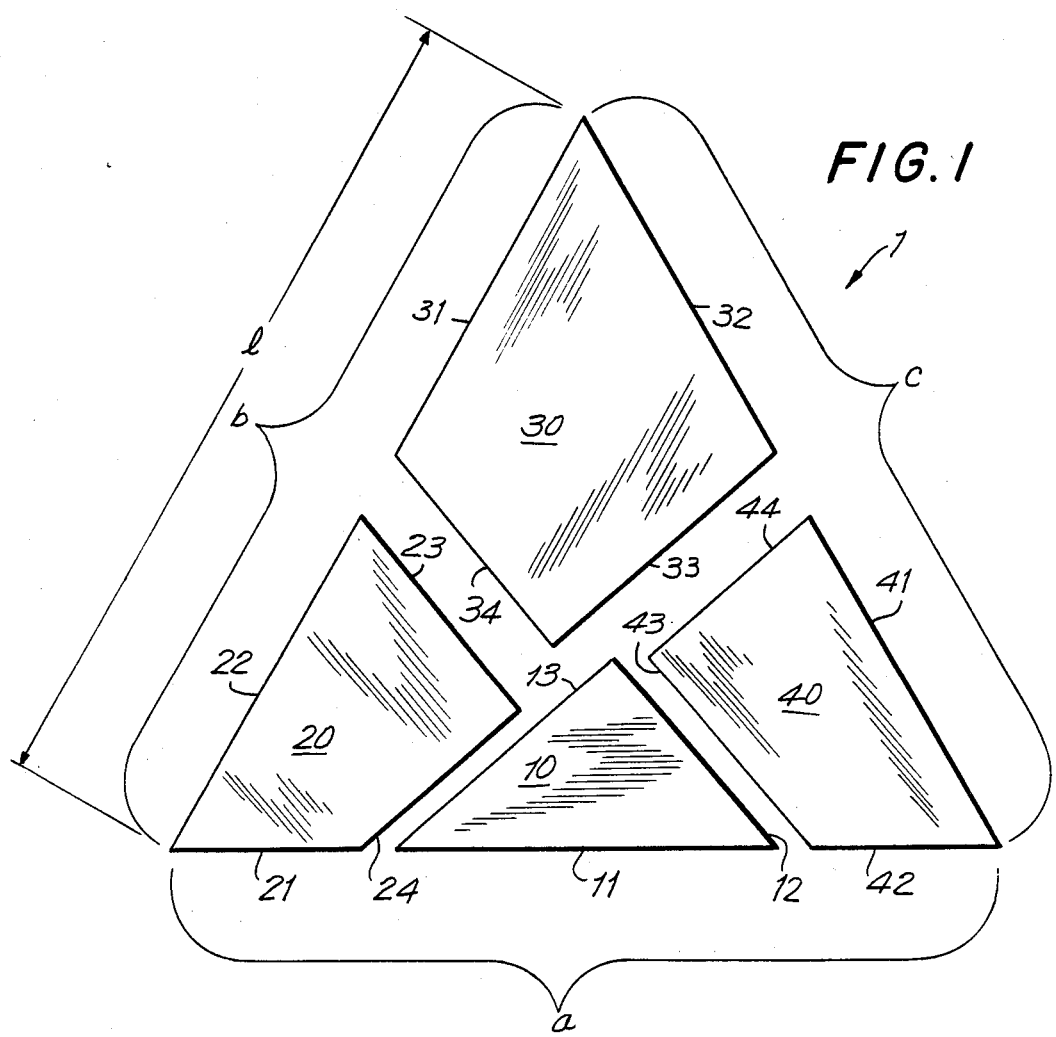
FIG. 1 is an equilateral triangle comprised of four geometric elements, shown in spaced apart relationship.
Figure 2:
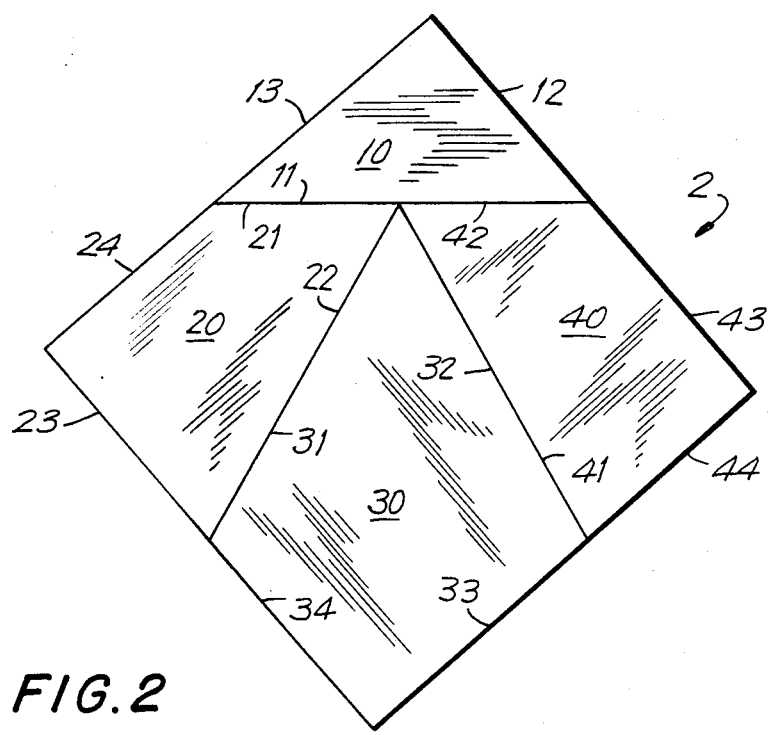
FIG. 2 is a square also comprised of the four geometric elements shown in FIG. 1, shown in abutting relationship.

The four geometrically shaped elements that are the basis for the toy of the present invention are illustrated in FIG. 1 in spaced apart relationship, said elements, when placed in abutting relationship, forming an equilateral triangle having sides of length l. Rearrangement of said geometrically shaped elements also provides the square 2 shown in FIG. 2.

The four elements 10, 20, 30 and 40 are next described, with reference to FIG. 1. The equilateral triangle formed by the elements 10, 20, 30 and 40 is designated generally by the numeral 1, and the sides of the equilateral triangle are designated by the letters a, b and c as shown in FIG. 1. Element 10 is a right triangle having a hypotenuse of length $\frac{1}{2}l$, a first leg 12, and a second leg 13. Element 20 is a quadrilateral having a first side 21 of length $\frac{1}{4}$l, a second side 22, a third side 23, and a fourth side 24. Element 30 is a quadrilateral having a first side 31 of length $\frac{1}{2}$l, a second side 32 of length $\frac{1}{2}$l, a third side 33, and a fourth side 34. Element 40 is a quadrilateral having a first side 41 of length $\frac{1}{2}$l, a second side 42 of length $\frac{1}{4}$l, a third side 43, and a fourth side 44. It is seen thet when the elements 10, 20, 30 and 40 are composed into the equilateral triangle 1, that leg 12 of element 10 and side 43 of element 40 are in abutment and of equal length, and that the hypotenuse 11 of element 10 is collinear with side 42 of element 40. It is also seen that leg 13 of element 10 and side 44 of element 40 together form a line that bisects side c of equilateral triangle 1 and intersects side a to give side 21 of element 20 the length $\frac{1}{4}$l. In addition, side 23 of element 20 bisects side b of equilateral triangle 1 and is normal to leg 13 of element 10, while side 43 of element 40 is normal to side 33 of element 30 and intersects side a of the equilateral triangle to give side 42 the length $\frac{1}{4}$l.

Figure 3:
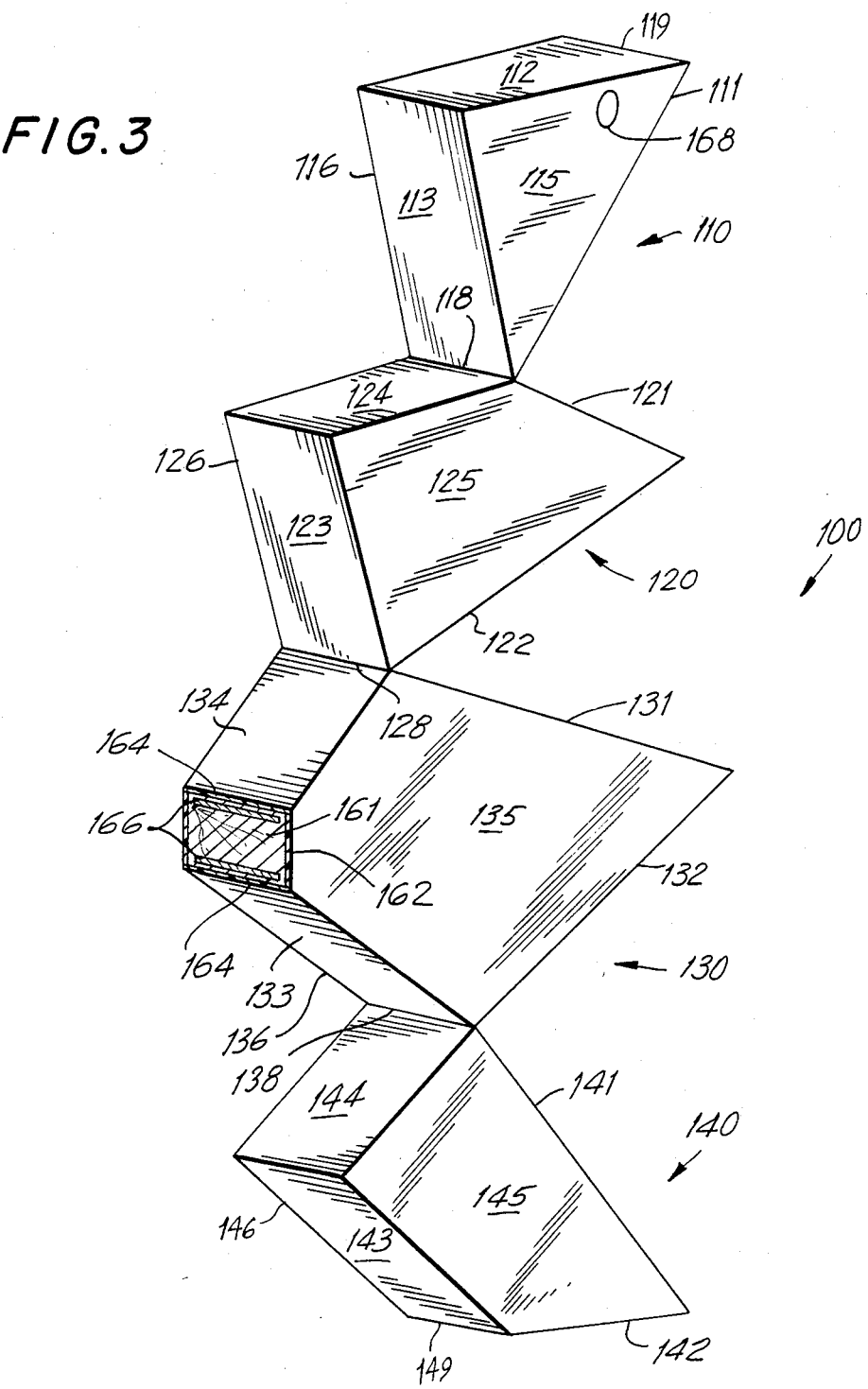
FIG. 3 is a perspective view of one embodiment of the toy of the present invention.
Figure 4:
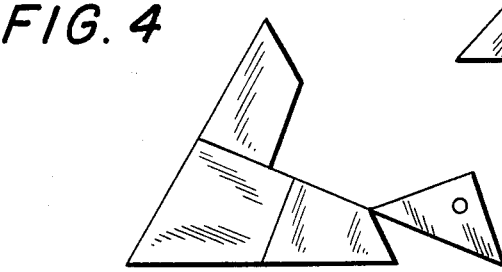
Figure 5:
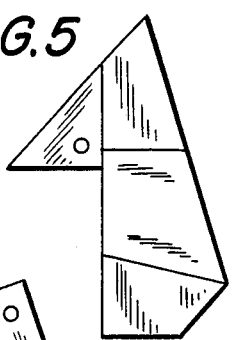
Figure 6:
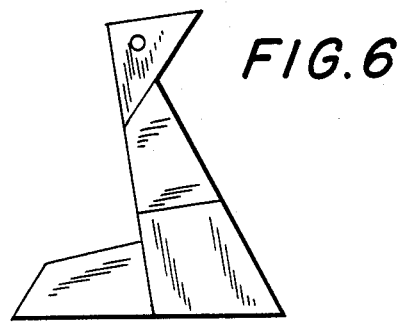
Figure 7:
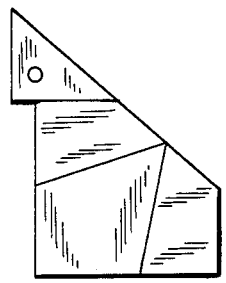
Figure 8:
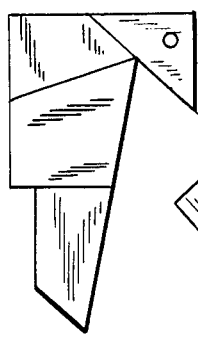
Figure 9:
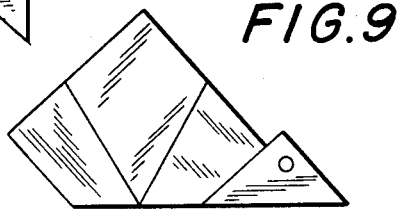
Figure 10:
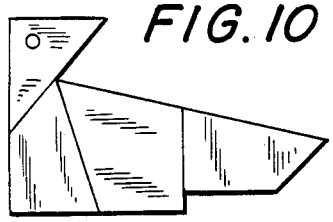
Figure 11:
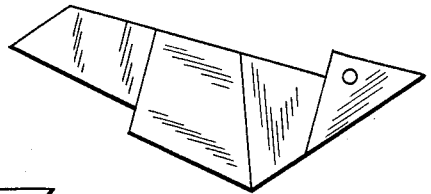
Figure 12:
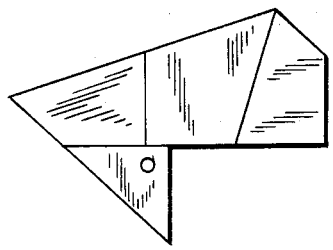
Figure 13:
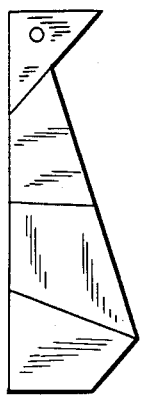
Figure 14:
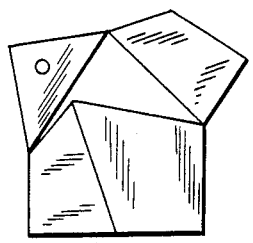

One embodiment of the toy of the present invention is shown in FIG. 3, the toy shown being generally designated by numeral 100, and including four geometric members 110, 120, 130 and 140 of predetermined thickness, which members are substantially similar in geometry to the four elements 10, 20, 30 and 40 previously described. In FIG. 3, which shows the toy 100 in an uncoiled state, the first member 110 includes side walls 111, 112, 113, front face 115 and rear face 116, the second member includes side walls 121, 122, 123, 124, front face 125 and rear face 126, the third member includes sidewalls 131, 132, 133, 134, front face 135 and rear face 136, and the fourth member includes side walls 141, 142, 143, 144, front face 145 and rear face 146. The four geometric members are sequentially connected in rotatable manner, as now described. The first member 110 is rotatably connected to the second member 120 along line 118, formed by the abutment of the edge formed by the sides 111 and 113 of member 110 with the edge formed by the sides 121 and 124 of member 120. Similarly, the second member 120 is rotatably connected to the third member 130 along line 128, formed by the abutment of the edge formed by the sides 122 and 123 of member 120 with the edge formed by the sides 131 and 134 of member 130. Finally, the third member 130 is rotatable connected to the fourth member 140 along line 138, formed by the abutment of the edge formed by the sides 132 and 133 of member 130 with the edge formed by the sides 141 and 144 of the fourth member 140.

It has been found that the connection lines 118, 128 and 138 shown in FIG. 3 are critical in the toy 100 if the representations of animal figures is to be maximized. Thus, for example, the embodiment illustrated in FIG. 3 has been found to be manipulable into the thirteen representations shown in profile in FIGS. 4 to 16 and listed in Table I. Conversely, it has been found that substituting the line of connection available by joining edge 119 of member 111 and edge 149 of member 140 for any one of the lines of connection 118, 128 and 138 is not suitable for obtaining animal representations.

The members 110, 120, 130 and 140 may be made with any suitable material or combination of materials. These members may be wood blocks or, as shown in FIG. 3, a wood block 161 laminated with plastic sheet 162. The members in this embodiment may be joined by in suitable manner, for example, by hinges, provided, however, that rotation is unimpaired by the presence of said hinge and the hinge permits flush abutment of the sides of adjoining members, for example, the sides 123 and 134 of members 120 and 130, respectively. Hinge means that are particularly suitable would be a pair of flexible plastic members opposingly secured to adjacent side walls of adjacent members. For example, one hinge of the pair would be secured to side walls 113 and 124 and the other hinge of the pair would be secured to side walls 111 and 121, thereby rotatably connecting members 110 and 120. In an especially preferred plastic hinge embodiment, a single "living" hinge member would be provided, said hinge member being a plastic tab inserted and securely retained in abutting edges of adjacent members, said plastic tab having a transverse resilient portion proximate the longitudinal center thereof. This embodiment is illustrated in FIG. 3a, a partial exploded perspective view of the toy 100, wherein the "living" hinge is designated by numeral 170. The hinge 170 comprises end portions 171 and 172, and a central flexible portion 173. Each of the end portions 171 and 172 are positioned in slots 175 provided in the abutting edges 128 and 128' of members 120 and 130, respectively. Another means to connect said members for rotatability about the lines of connection 118, 128 and 138 is to provide an endless band of pressure adhesive tape 164 about the sides of the elements, as illustrated in FIG. 3.

Means may optionally be provided so that the sides of adjoining members 110, 120, 130 and 140 may be detachably connected one to the other when a side is in abutting relationship with another side. In FIG. 3, magnet means 166 are illustrated. Another means could be the use of reticulated nylon material, for example, Velcro TM, or the like.

Regarding another aspect of the present invention, elements affixed to or attachable to the members 110, 120, 130 or 140 can be provided, which elements are adapted to further characterize one or more of the representations of animals obtained by rotational positioning of said members. Thus, for example, said elements may include one or more of the following: eyes, ears, nose or beak, feathers, fins, and the like. Moreover, these elements may further include one or more sets of elements, each conforming to the shapes of the geometric members 110, 120, 130 or 140, said elements being attachable and detachable, for example, by adhesive means, on the face wall or rear wall of member of correspondingly shaped geometry. These sets of elements would be adapted to characterize or further characterize the animals representations obtained by rotational positioning of the said geometric members. It is contemplated that instructions in written form or as diagrams be provided.

Another aspect of the present invention concerns a method for forming from the four geometrically shaped elements 10, 20, 30 and 40 a plurality of said stylized representations of animals, the method comprising the step of arranging said geometrically shaped elements 10, 20, 30 and 40 to predetermined positions, whereby the stylized representations of animals are obtained. Where the elements are at least detachably sequentially connected, i.e., in accordance with the embodiment 100 of the toy of the present invention having the members 110, 120, 130 and 140, the method comprises the step of rotatably arranging said attached geometric members to predetermined positions, whereby the stylized representations of animals are obtained. The method further comprises the step of detachably attaching detachable members along lines of connection to provide the sequence: member 110, member 120, member 130 and member 140, said lines of connection being as designated in FIG. 3.

In accordance with the methods and further in accordance with the device of the present invention, the stylized representations of animals shown in profile in FIGS. 4–16 and as listed in Table I may be obtained. In FIGS. 4–16, the characterization of the animals obtained is augmented by proper positioning of an eye 168.

TABLE I

| FIG. | STYLIZED ANIMAL REPRESENTATION |
|------|-------------------------------|
| 4    | Squirrel                      |
| 5    | Cardinal                      |
| 6    | Cobra                         |
| 7    | Cat                           |
| 8    | Vulture                       |
| 9    | Turtle or snail               |
| 10   | Fox                           |
| 11   | Bird                          |
| 12   | Whale                         |
| 13   | Kangaroo                      |
| 14   | Skunk                         |
| 15   | Armadillo                     |
| 16   | Earthworm                     |

Figures 17, 18:
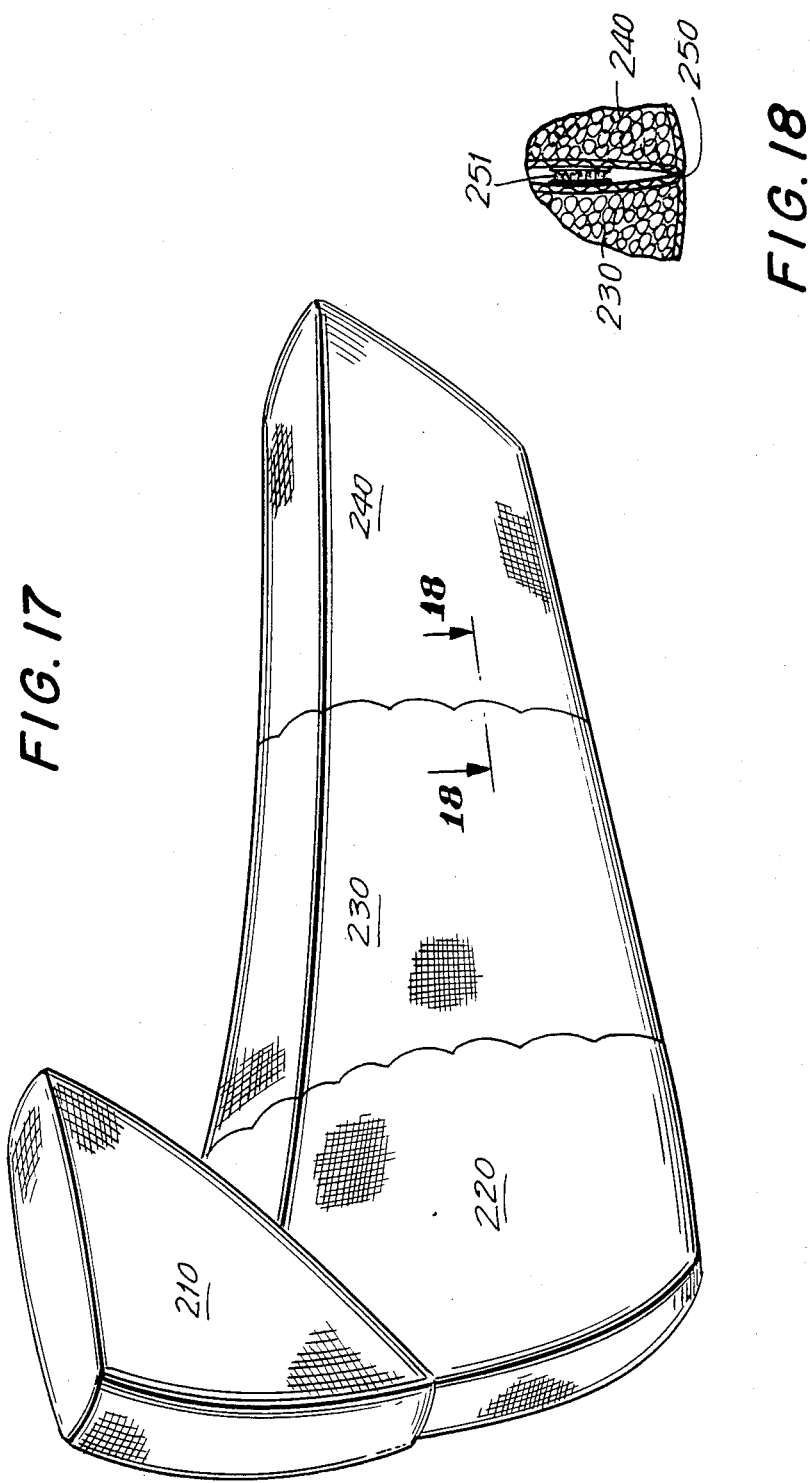
FIG. 17 is a perspective view of another embodiment of the toy of the present invention.
FIG. 18 is a cross-sectional view of the toy shown in FIG. 17, across lines 18—18 thereof.

FIG. 17 illustrates another embodiment 200 of the present invention comprising members 210, 220, 230 and 240, said members being analogous to corresponding members 110, 120, 130 and 140 of embodiment 100 shown in FIG. 3. In the embodiment 200, the geometric members are made of cloth, and filled with any suitable stuffing material, for example, sand, cotton or other natural or synthetic, preferably non-flammable, fiber material, rosin, or the like. The individual geometric member 210, 220, 230 and 240 are sequentially (as shown in FIG. 3) rotatably connected by stitching, designated by numeral 250, as shown in FIG. 18. Means, such as reticulated nylon 251 in FIG. 18, e.g., Velcro TM, previously described with respect to embodiment 100, may be provided for releasable attachment of adjoining side walls of said members. Similarly, means adapted to further characterize the animal representations obtained may be provided for releasable attachment.

What I claim is:

1. A toy for forming a plurality of stylized representations of animals, the toy comprising:
   (a) four geometric members each of predetermined thickness as defined by the side walls thereof and including a face wall and a rear wall, said geometric members being arrangeable to form a square and also being arrangeable to form an equilateral triangle, as viewed from the front or rear, the four geometric members being:
   (i) a first member that is a right triangle one side wall of which is the hypotenuse and another side wall of which is a leg thereof;
   (ii) a second member that is a quadrilateral;
   (iii) a third member that is a quadrilateral; and (iv) a fourth member that is a quadrilateral one side wall of which is equal in length to said leg of said first member and another side wall of which is adjacent to said one side wall of said fourth member, said leg abutting said one side wall of the fourth member and said hypotenuse being collinear with said another side wall of the fourth member in the equilateral triangle configuration;
   (b) means to sequentially connect said first member to said second member, said second member to said third member, and said third member to said fourth member, to provide rotatability of said members from and to said square and equilateral triangle configurations, and
   (c) at least one element attached to at least one geometric member, said at least one element being adapted to characterize rotational positionings of said four geometric members in positions intermediate to said square and said equilateral triangle configurations as the stylized representations of animals, said at least one element being an eye provided on said first member.

2. The toy according to claim 1 wherein the four geometric members are sequentially detachably connected.

3. The toy according to claim 1 wherein the four geometric members are sequentially affixedly connected.

4. The toy according to claim 1 wherein the at least one element (c) further includes one or more of the following: ears, nose, beak, feathers or fins.

5. The toy according to claim 1 wherein the four geometric members are made of cloth and filled with a stuffing material.

6. The toy according to claim 5 wherein the means to sequentially connect said members is stitching.

7. The toy according to claim 1 further comprising means to detachably attach abutting side walls.

8. The toy according to claim 7 wherein the abutting side wall attachment means is one of the following: magnets, reticulated nylon, or adhesive tape.

9. The toy according to claim 1 wherein the geometric members comprise blocks.

10. The toy according to claim 9 wherein the means to sequentially connect said geometric members are flexible plastic hinges.

11. The toy according to claim 9 wherein said geometric members further comprises outer laminates affixed to one or more surfaces of said blocks.

12. The toy according to claim 9 wherein the means to sequentially connect said geometric members is an endless band of material secured to the side walls of said connected members.

13. The toy according to claim 1 provided in kit form, and further comprising written instructions illustrating the stylized animal representations obtainable by the rotational positioning of the geometric members.

* * * * *